Figure 1:
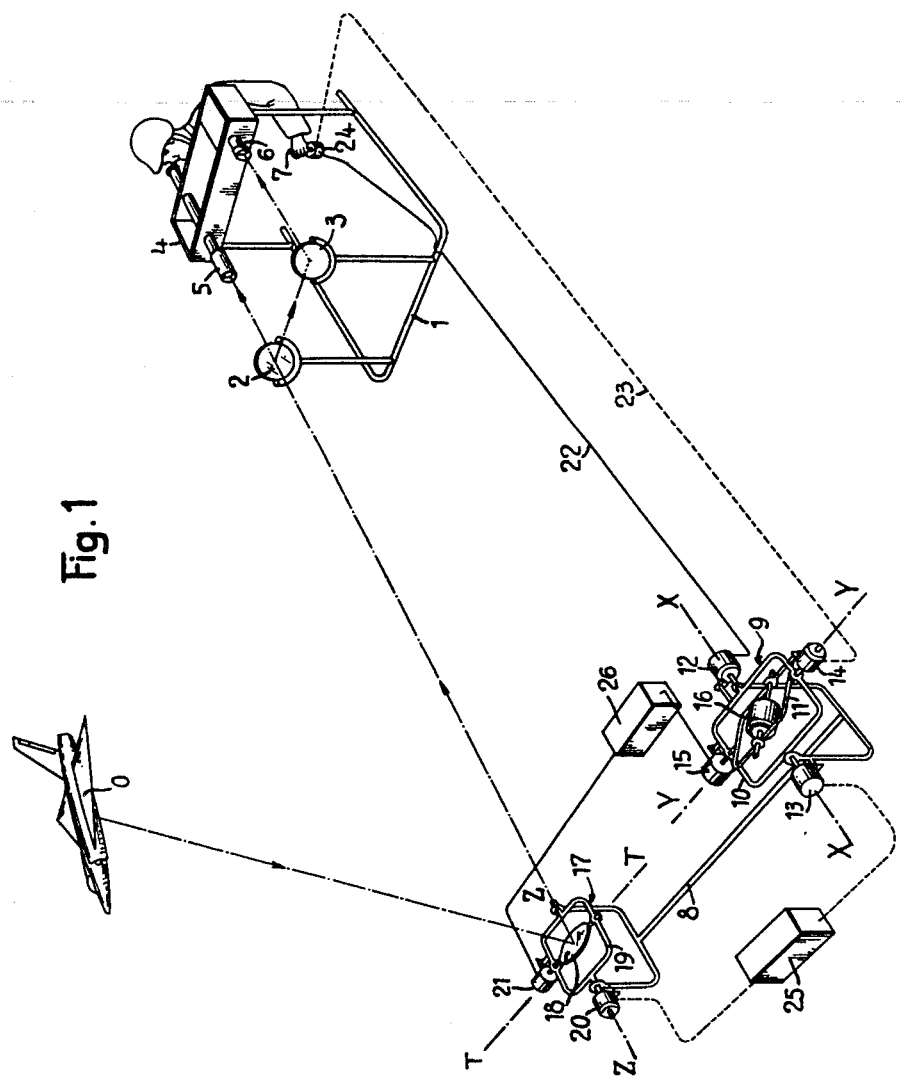

3,406,402
OPTICAL AIMING DEVICE
Emile Stauff, Versailles, and Jean-Paul Meyer, Paris, France, assignors to Nord-Aviation Societe Nationale de Constructions Aeronautiques, Paris, France, a French body corporate
Filed Oct. 28, 1963, Ser. No. 319,351
Claims priority, application France, Nov. 27, 1962, 916,697
6 Claims. (Cl. 343—225)

The invention relates to a device for improving the accuracy of aiming on a moving radius the axis of an orientatable detecting or telecontrolled apparatus, and in particular a detector in the direction of an object travelling along the ground, on the sea or in space, said device comprising a sight or other system (such as a telescope or television camera) whose optical axis, which is directed onto an objective, defines a line of sight.

Said detecting or telecontrol apparatus can comprise a detector, such as a goniometer which operates within the infra-red, visible, or ultra-violet spectrum and receives radiations emitted by a mobile object. This orientatable apparatus could also comprise, for example, a high-frequency telecontrol antenna which must be directed or aimed accurately on a mobile object to be guided. Said orientatable apparatus could also be a combination of a detector and a telecontrol antenna.

Furthermore, it is often desirable for this apparatus to be capable of guiding a mobile object (as a missile) in the direction of a mobile target moving on the ground, on the sea or in space, such as an aircraft.

In this case, the target is permanently followed by means of a sight. Coupled with the sight is a detector comprising a goniometer responsive for example to infra-red radiations which detects the deviations of the mobile object from the line of sight. By means of these deviations correcting orders are at each moment formed and transmitted to the mobile object by telecontrol.

However, in practice in such a system the accuracy of the guiding is generally affected by the difficulty of maintaining the axis of sight exactly on the target (which may travel at apparent speeds which are very varied and variable in time). This difficulty is due mainly to the inertia of equipment that has to be moved, particularly when the detector is rigidly coupled with the sight (when the detector is simply controlled to remain parallel with the axis of the sight, the required precision in the parallelism cannot be insured). One cause of inaccuracy is also due to variations in orientation the sight is subjected to when it is mounted on a moving platform which, generally, consists of a vehicle (ground, sea or air vehicle).

The object of the invention is to provide an aiming device which permits accurately maintaining the axis of the sighting system in the direction of the target, while the latter moves and which permits maintaining strict coincidence between the axis of the sight and that of the detector during this movement.

The device according to the invention comprises an orientation support on which is wholly or partly mounted the sighting and detecting system, said support being stabilized by a precession gyroscope controlled by torque-motors. The term torque-motor is employed in the present description to designate a motor of any type, and in particular an electric motor, employed in such manner as to create a couple or torque on a shaft, the rotation of this motor being very small or even nil.

As the precession speed is proportional to the couple, a very precise piloting or guiding is obtained independently of the inertia of the system irrespective of the speed to attain contrary to what occurs in conventional systems in which the acceleration is proportional to the couple and consequently results in the direct intervention of inertia.

In the absence of orders, the support retains a fixed orientation irrespective of the movements of the moving platform (ship, air-craft, land vehicle, etc.).

In a first embodiment of the invention (not shown in the drawings) applicable when the equipment is of small mass, the sight and the detector are mounted on a common support which insures exact parallelism between their axes, and this common support is carried by said stabilized support or constitutes this support.

According to a second embodiment of the invention applicable in the most common case where the mass of the system is important, the stabilized support only receives an optical assembly which reflects the incident rays in the fixed direction of the sight-detector unit whose optical axes are exactly parallel, by construction.

Such a device can generally be of utility in the orientation of the axis of detecting devices or remote-control devices (such as remote-control antennas, radar antennas) in the direction of mobile objects. It can in particular be employed for guiding a mobile object (e.g. a missile) toward a target; in this case it is associated with a remote control or telecontrol device comprising a calculator electrically connected to a goniometer adapted for detecting and measuring the angular deviations of the mobile object from the line of sight, and the calculator forming from these deviations correcting orders which are transmitted to the mobile object by telecontrol.

Further features and advantages of the invention will be apparent from the ensuing description, with reference to the accompanying drawings.

Figure 2:
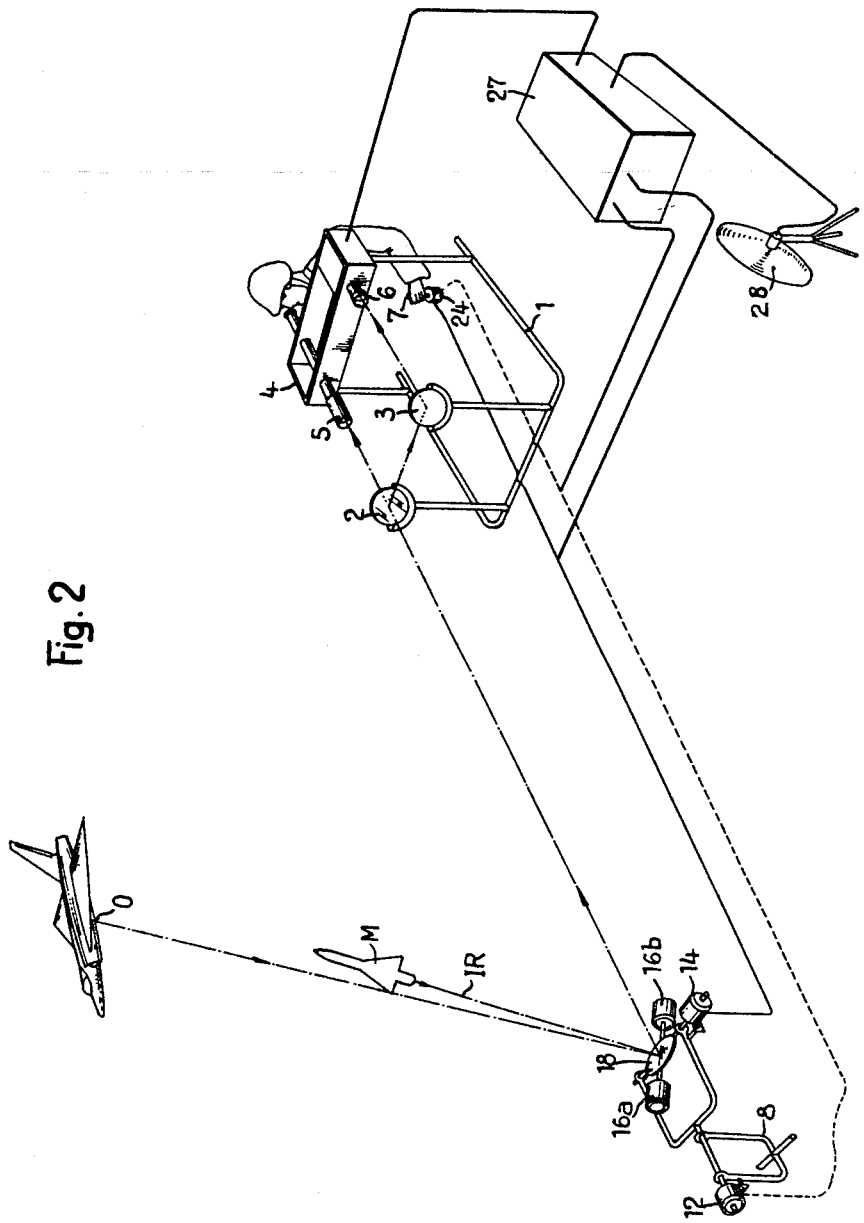

In the drawings:

FIGS. 1 and 2 are diagrammatic perspective views of two embodiments of the invention.

In the embodiment shown in FIG. 1, the device comprises: a first fixed support 1 on which are rigidly mounted two fixed mirrors 2 and 3 and a fixed chassis 4 which supports a telescopic sight 5 and a goniometer 6 in strict parallelism, and a piloting stick 7 movable relative to the first fixed support, and a second fixed support 8; these supports 1 and 8 are fixed on a platform which is generally movable, such as the deck of a ship, an aircraft, a land vehicle, etc.

Mounted on one of the ends of the support 8 is a gyroscope 9 having two gimbals 10 and 11.

Mounted on the axis of rotation X—X of the gimbal 10 are a torque-motor 12 and a rotation detector 13, the latter expression designating any apparatus furnishing a physical value, for example a voltage, which is a function of the angular position of the element that drives this detector. Mounted on the axis of rotation Y—Y of the gimbal 11 are a torque-motor 14 and a rotation detector 15.

The gimbal 11 carries the top 16 of the gyroscope.

Mounted on the other end of the support 8 is a universal joint 17 having two axes Z—Z and T—T carrying a reflecting element 18 on a first support shaft connected to an electric motor 21 and having an optical centre which coincides with the intersection of the two axes Z—Z, T—T. This shaft is rotatably mounted, to rotate about axis T—T on a second support 19 consisting in a gimbal which is rotatably mounted, to rotate about axis Z—Z, on the fixed support 8; on the axis of this gimbal 19 is mounted an electric motor 20.

The two torque-motors 12 and 14 are connected by conductor leads 22, 23 to a regulating element 24 which is controlled by the piloting stick 7 and whose function is to regulate the supply currents of these torque-motors in such manner as to obtain a regulation of the angular speed of each of these torque-motors.

The two motors 20 and 21 are connected to the two rotation detectors 13 and 15 by two control units 25, 26.

This device operates in the following manner:

The displacement of the piloting stick sends each of the torque-motors 12 and 14 a current which is proportional to the desired angular speed. The torque-motor 14 creates, under the effect of the current it receives, an electromagnetic torque which is applied to the axis of the gimbal 11. By gyroscopic effect, the gimbal 10 rotates about its axis X—X at a speed which is proportional to the intensity of the torque applied to the axis of the gimbal 11. This rotation is detected by the detector 13 and transmitted through the medium of the electronic servo-control system or unit 25 to the motor 20 which rotates the gimbal 19 of the universal joint 17 at the same speed and through the same angle as the gimbal 10.

The procedure is the same when starting with the torque exerted by the torque-motor 12 which acts on the motor 21 through the medium of the servo-control system or unit 26.

Thus, the stick 7 permits orientating the reflector 18 in any direction.

Thus, the operator pilots or shifts, through the medium of the stick 7, the movable reflector 18 in such manner that the image of the object O remains in the middle of the cross-wires of the fixed telescopic sight 5 and on the axis of the detector 6, the image of this object being transmitted to the sight by reflection on the movable reflector 18, which could consist of a mirror or a total-reflection prism, this light passing through the semi-reflecting element 2. This image is transmitted to the detector by reflection on elements 18, 2 and 3 and the detector 6 is thus able to furnish at any moment the angular deviation relative to this axis of any mobile object, for example a missile, which is located in the field of vision and emits radiations (such as light, infra-red or ultra-violet radiations) which can be detected by the detector 6.

In the embodiment shown in FIG. 2, the gyroscopic system directly supports the movable reflector 18. The latter is mounted at the intersection of the axes of the gyroscope gimbals. Each of the axes of the gyroscope carries the same motor-couples 12 and 14. The gyroscope top is divided into two masses 16a, 16b.

In this embodiment, the rotation detectors and the transmission means (control units 25, 26 and motors 20, 21) are dispensed with.

The device shown in FIG. 2 is employed for piloting a missle M toward a target O. The infra-red ray emitted by the missile M follows the path 18–2–3–6 and is received by the goniometer 6 which constantly measures the deviation between the missile M and the line of sight 18–0. This deviation is communicated to a calculating transmitter 27 which transmits, through the medium of a telecontrol antenna 28, correction orders to the missile. The deviations can also serve to aim the antenna at the missile.

The embodiment shown in FIG. 1 possesses great flexibility in the arrangement of the various devices. However, it has the drawback of introducing an additional control chain which in certain cases is liable to slightly affect the accuracy of the piloting. The embodiment shown in FIG. 2 is simpler in construction and does not have this drawback.

The device according to the invention can be constructed in accordance with various variants.

In particular the constructional requirements lead in some cases to other arrangements of the aiming device. In practice, the movement through a universal joint of the reflecting element is generally obtained by the product of two rotations about orthogonal axes. The reflector is movable about a horizontal axis. This axis is itself carried by a gimbal turning about the vertical axis. The variations of the angles of rotation about the vertical axis (azimuth) and about the horizontal axis (elevation) are always controlled by the informations from the rotation detectors 13 and 15 (the embodiment shown in FIG. 1).

When the sight and goniometer have a small mass they are directly mounted on the azimuth plate and receive the rays orientated in the vertical plane by the reflector. In the event that the equipment has a very small mass it can also be fixed on a common structure such as the support 4, which insures the strict parallelism of the axes of the sight and the detector, this common structure constituting the platform stabilized by the gyroscope having a controlled precession. In this case the reflector device may be unnecessary.

In practice, in cases (FIGS. 1 and 2) where a reflecting device 18 is employed, the various masses and necessity of maintaining an image suitably orientated relative to the pilot, lead to a limitation in the movements of the reflector.

The assembly of the sighting system is then controlled by the displacement of the reflector, by means of information furnished by the rotation detectors 13, 15 (FIG. 1).

As the "fine" piloting is afforded by the stabilized reflector optical assembly, a rather rough control is sufficient for the rest of the device so far as accuracy and response time is concerned, since all that is required of it is to maintain the reflector within its maximum amplitude of movement. This control can be such, however, that the movement of the assembly does not result in any substantial reaction in the orientation of the incident ray relative to the common axis of the sight and detector. For this purpose, a second pair of detectors may be provided to measure the movements of the sight-detector platforms and enable the angular corrections (theoretically) equal to half the detected angle to be made to the reflector to maintain the reflected ray in coincidence with the axis.

Although specific embodiments of the invention have been described, many modifications and changes may be made therein without departing from the scope of the invention as defined in the appended claims.

Having now described our invention what we claim as new and desire to secure by Letters Patent is:

1. A telecontrol apparatus for guiding, toward a mobile target, a mobile object including means for correcting the direction thereof in response to radio control signals, said apparatus comprising: a fixed support adapted to be fixed on a movable platform such as a ship, an air-craft, a land vehicle; a sight having an optical axis defining a line of sight, said sight being rigidly fixed on said fixed support, a radiation detector operative to detect radiations selected from the group comprising infra-red rays, visible light rays, and ultra-violet rays, said detector having an optical axis and being rigidly fixed on said fixed support, said two axes being parallel; an orientatable support rotatably supported by said fixed support and having two degrees of freedom; a reflector fixed to said orientatable support and having its center positioned on said line of sight, and means whereby a light beam from the target and radiation from the mobile object can be made to substantially coincide at the reflector whereby said reflector can be oriented to constantly reflect, partly along the sight axis and partly along the detector axis the light beam from said movable target, and to reflect into the detector the radiations from said mobile object; said means comprising precessing gyroscope means operatively connected to said orientatable support to ensure stabilization thereof, torque-motors operatively connected to said gyroscope means and hand-controlled electric means electrically connected to said torque-motors to control the precession of said gyroscope means and thereby the attitude of said reflector; said detector including means for detecting and measuring the deviations of the mobile object relative to the line of sight, and said apparatus further comprising a calculator connected to said detector for converting said deviations to analog correction signals, means for converting said analog signals to radio control signals, and means for transmitting said control signals to said mobile object.

2. An apparatus as claimed in claim 1 wherein said orientatable support comprises a first gimbal rotatably mounted on said fixed support to rotate, relative thereto, about a first axis, and a second gimbal rotatably mounted on said first gimbal to rotate, relative to said first gimbal, about a second axis said two axes being orthogonal; and said reflector is rigidly mounted on said second gimbal to rotate therewith.

3. An apparatus as claimed in claim 2, wherein said gyroscope means comprise two rotors rotatably mounted on said second gimbal and two torque motors respectively mounted on said first and second gimbals to control the precession of said rotors.

4. An apparatus as claimed in claim 2, wherein said gyroscope means comprise: a second orientatable support comprising a third gimbal rotatively mounted on said fixed support to rotate, relative thereto, about a third axis, and a fourth gimbal rotatably mounted on said third gimbal to rotate, relative to said third gimbal about a fourth axis, said third and fourth axes being orthogonal; one rotor rotatably mounted on said fourth gimbal, two torque motors respectively mounted on said third and fourth gimbals, said electric hand-controlled means being electrically connected to said torque motors to control the precession of said rotor; said apparatus further comprising remote control means for transmitting to said orientatable support carying said reflector the variations of the precession of said rotor.

5. An apparatus as claimed in claim 4, wherein said remote control means comprise two rotation detectors respectively mounted on said third and fourth gimbals and two control units each connected between one of said rotation detectors and one motor of one of said first and second gimbals.

6. An apparatus as claimed in claim 1, comprising an auxiliary reflecting system arranged on the line of sight and adapted to split the light beam reflected by the reflector into two portions respectively directed along the sight axis and along the detector axis.

References Cited

UNITED STATES PATENTS

| | | | |
|---|---|---|---|
| 2,758,377 | 8/1956 | Claret et al. | 88—1 |
| 2,944,763 | 7/1960 | Grandgent et al. | 88—1 |
| 3,114,842 | 12/1963 | Davidson. | |
| 2,414,108 | 1/1947 | Knowles et al. | 33—49.2 |
| 2,657,464 | 11/1953 | Ford | 33—49 |
| 2,715,776 | 8/1955 | Knowles et al. | 33—49.3 |
| 2,756,625 | 7/1956 | Johnson | 33—49.3 |
| 3,019,711 | 2/1962 | Bailey et al. | 33—49 |
| 3,035,477 | 5/1962 | Bosch et al. | 33—49 |

JOHN W. CALDWELL, *Primary Examiner.*

A. J. KASPER, *Assistant Examiner.*